(12) United States Patent
Hayakawa

(10) Patent No.: US 9,596,370 B2
(45) Date of Patent: Mar. 14, 2017

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Mizuki Hayakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/921,957

(22) Filed: Oct. 23, 2015

(65) Prior Publication Data
US 2016/0127588 A1 May 5, 2016

(30) Foreign Application Priority Data

Oct. 29, 2014 (JP) ................. 2014-220746

(51) Int. Cl.
*H04N 1/04* (2006.01)
*H04N 1/00* (2006.01)
*H04N 1/40* (2006.01)

(52) U.S. Cl.
CPC ....... *H04N 1/00572* (2013.01); *H04N 1/0058* (2013.01); *H04N 1/0062* (2013.01); *H04N 1/00567* (2013.01); *H04N 1/00641* (2013.01); *H04N 1/00795* (2013.01); *H04N 1/00803* (2013.01); *H04N 1/40* (2013.01)

(58) Field of Classification Search
CPC ....... H04N 2201/3232; H04N 1/00572; H04N 1/00816; H04N 1/0402; G06F 2213/0038; G06F 17/241; G06F 3/038; G06F 3/0418; G06F 3/0425; G06F 3/04883; G06K 17/0032; G06K 2017/0038; G06K 7/14

USPC ... 358/1.15, 448, 1.14, 474, 498, 1.12, 1.13, 358/1.18, 1.5, 3.28, 483; 399/361
See application file for complete search history.

(56) References Cited

U.S. PATENT DOCUMENTS

| | | | |
|---|---|---|---|
| 8,520,274 B2* | 8/2013 | Sahara | H04N 1/203 358/1.6 |
| 2007/0086069 A1* | 4/2007 | Matsuzaka | H04N 1/00 358/500 |
| 2007/0127077 A1* | 6/2007 | Tamura | H04N 1/32144 358/3.28 |

(Continued)

FOREIGN PATENT DOCUMENTS

JP  2001-320513 A  11/2001

*Primary Examiner* — Negussie Worku
(74) *Attorney, Agent, or Firm* — Canon USA, Inc. I.P. Division

(57) ABSTRACT

An image processing apparatus acquires a plurality of first images and one or a plurality of second images. The first images are acquired through a first reading operation in which a reading apparatus sequentially reads first sides of a plurality of document sheets. The second images are acquired through a second reading operation in which the reading apparatus reads second sides of one or more of the plurality of document sheets. In a case where the number of second images acquired is smaller than the number of first images acquired, the image processing apparatus determines a sequence of the plurality of first images and the one or the plurality of second images such that sequential numbers of the one or the plurality of second images are differently set depending on whether an interrupting factor has arisen.

19 Claims, 14 Drawing Sheets

(56) References Cited

U.S. PATENT DOCUMENTS

| | | | |
|---|---|---|---|
| 2008/0018944 A1* | 1/2008 | Morita | H04N 1/00639 358/296 |
| 2008/0278770 A1* | 11/2008 | Sakuramata | H04N 1/387 358/448 |
| 2011/0134444 A1* | 6/2011 | Lee | H04N 1/0044 358/1.5 |
| 2011/0243637 A1* | 10/2011 | Nakamura | B41J 3/60 400/583 |
| 2013/0215475 A1* | 8/2013 | Noguchi | H04N 1/32106 358/448 |
| 2015/0077777 A1* | 3/2015 | Hayakawa | H04N 1/00472 358/1.13 |
| 2015/0249755 A1* | 9/2015 | Hayakawa | H04N 1/00228 358/1.15 |
| 2016/0006890 A1* | 1/2016 | Hayakawa | H04N 1/00228 358/1.15 |
| 2016/0259604 A1* | 9/2016 | Hayakawa | H04N 1/00169 |

* cited by examiner

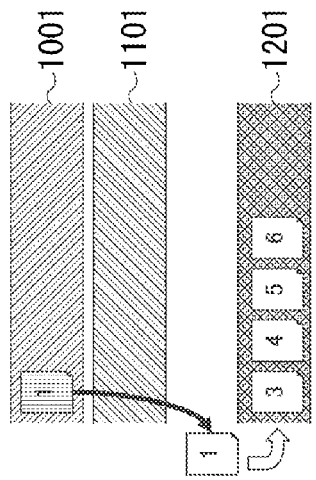
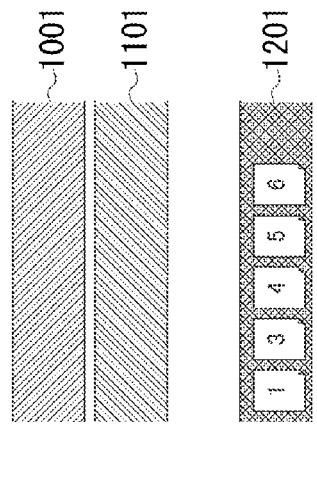
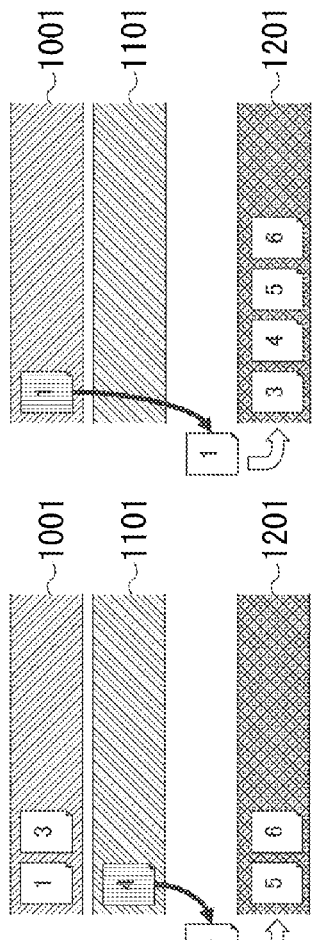
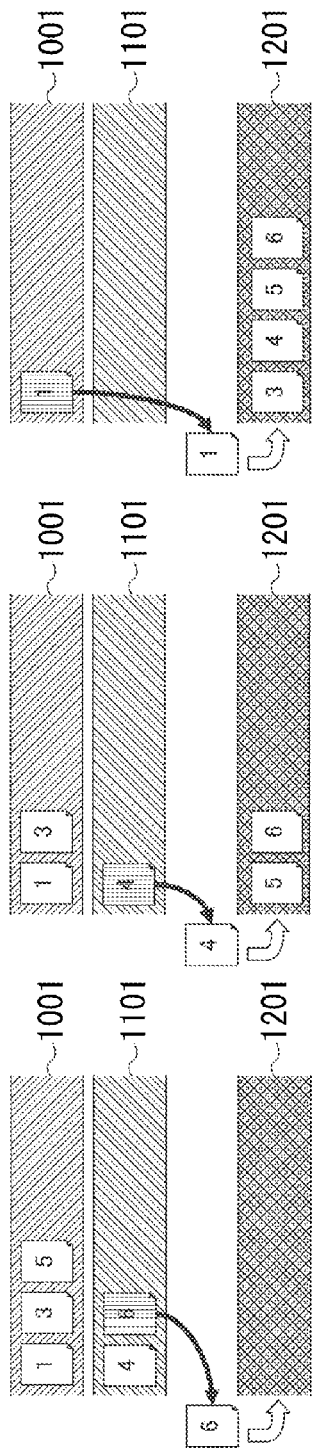
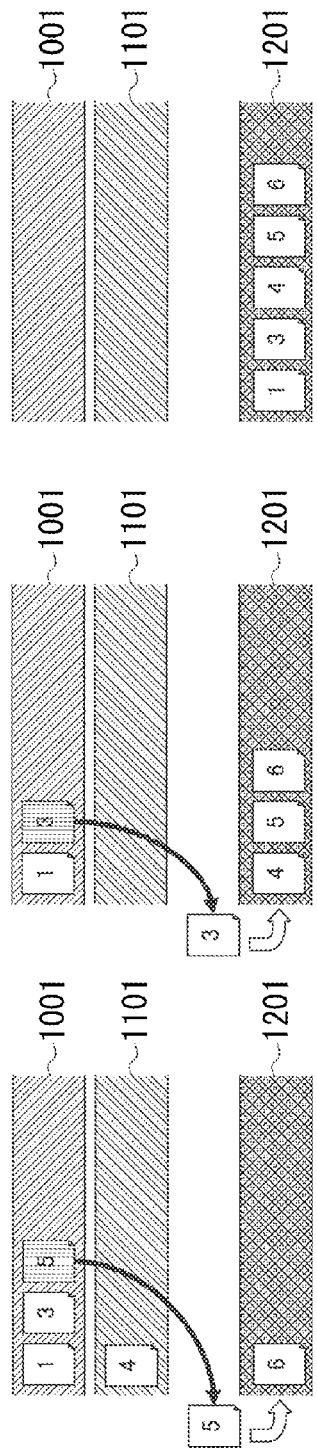

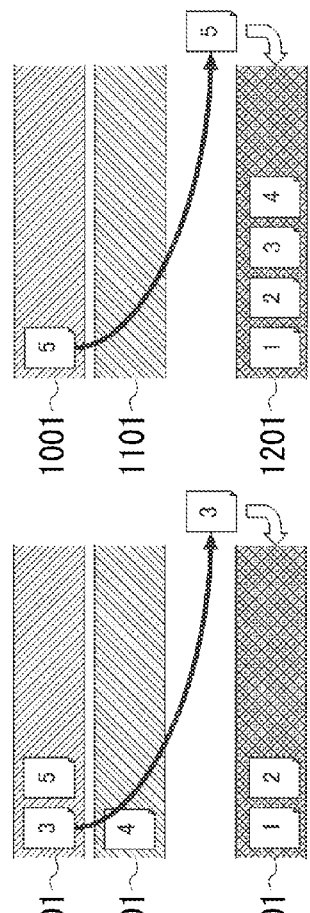
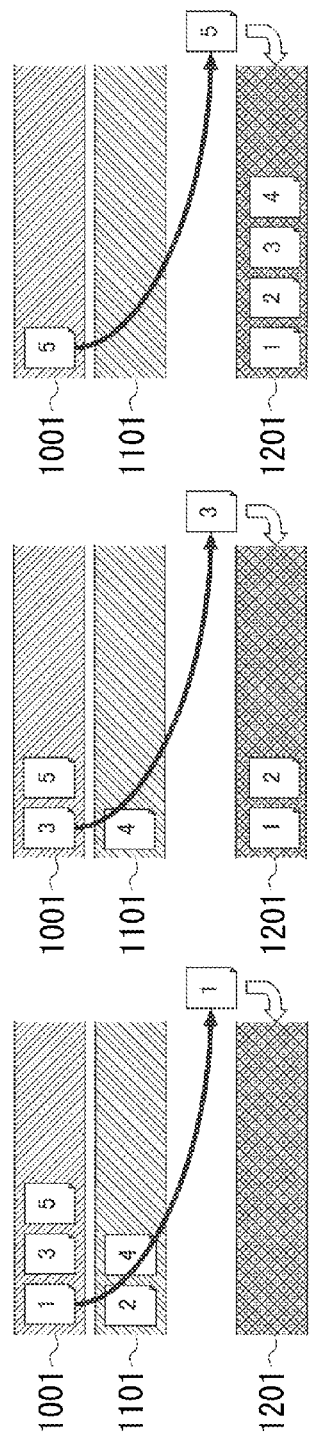
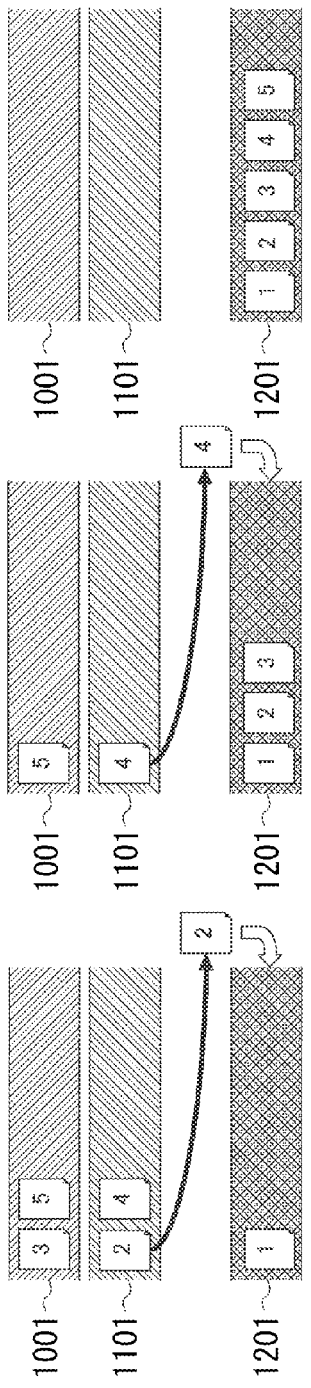

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium for determining the sequence of a plurality of images.

Description of the Related Art

There is a conventional technology that is applicable to image reading apparatuses equipped with an automatic document feeding mechanism for one-sided reading. In this technology, first an image reading apparatus sequentially reads the front sides of a plurality of document sheets, and then the back sides of the plurality of document sheets. Following this, the image reading apparatus determines the page sequence of the images acquired through the above reading operation.

In a case where data for an odd number of pages is printed on both sides of document sheets, for example, the back side of the last document sheet is blank. Accordingly, when an image reading apparatus reads the back sides of the document sheets after reading the front sides, there are cases where a user removes the last document and then places only the remaining document sheets on the automatic document feeder (ADF). In this case, the resultant images of the back sides are fewer than the images of the front sides.

Japanese Patent Application Laid-Open No. 2001-320513 discusses a technology in which the number of front-side images is compared to the number of back-side images and in a case where both numbers do not match each other, a predetermined sequence is determined for the images.

Various factors, however, would be responsible for a mismatch between the numbers of front and back-side images. During the operation of reading the back sides, for example, a read error may occur or a user may remove the last document sheet or give a cancel instruction. If such a factor in interrupting an operation of reading the back sides arises, the number of resultant back-side images is smaller than the number of the front-side images. The above technology discussed in Japanese Patent Application Laid-Open No. 2001-320513 fails to consider a situation in which an operation of reading back sides is interrupted. Thus, the technology determines the sequence of the read front and back-side images, independently of whether a cancel instruction has been given.

SUMMARY OF THE INVENTION

The present invention, which addresses the above disadvantage, is directed to an image processing apparatus that is capable of acquiring a plurality of images through an operation of reading first and second sides of document sheets and determining the sequence of the images, depending on whether a factor in interrupting the reading operation has arisen.

According to an aspect of the present invention, an image processing apparatus includes an acquisition unit configured to acquire a plurality of first images and one or a plurality of second images, the first images being acquired through a first reading operation in which a reading apparatus sequentially reads first sides of a plurality of document sheets, the one or the plurality of second images being acquired through a second reading operation in which the reading apparatus reads second sides of one or more of the plurality of document sheets, and a determination unit configured to determine a sequence of the plurality of first images and the one or the plurality of second images that the acquisition unit has acquired, wherein the determination unit determines, in a case where the number of second images acquired by the acquisition unit is smaller than the number of first images acquired by the acquisition unit, the sequence in manner sequential numbers of the one or the plurality of second images are differently set depending on whether a factor in interrupting the second reading operation has arisen.

Further features of the present invention will become apparent from the following description of exemplary embodiments with reference to the attached drawings.

BRIEF DESCRIPTION OF THE DRAWINGS

FIGS. 12A to 12F illustrate an example process for storing read images in a resultant image queue by a rearranging process.

FIGS. 14A to 14F illustrate an example process for storing read images in the resultant image queue by a rearranging process.

DESCRIPTION OF THE EMBODIMENTS

Some embodiments of the present invention will be described below with reference to the accompanying drawings. Embodiments that will be described below are not intended to limit the claims of the present invention, and all possible combinations of features of the embodiments should not be essential to solutions of the present invention.

A description will be given of an image reading system according to the exemplary embodiment, in which an image reading apparatus 100 and an information processing apparatus 200 are connected to each other. The image reading apparatus 100 or the information processing apparatus 200 acts as an image processing apparatus according to the present exemplary embodiment, so that processing on read images that the image reading apparatus 100 has acquired by reading document sheets is performed.

Figure 1:
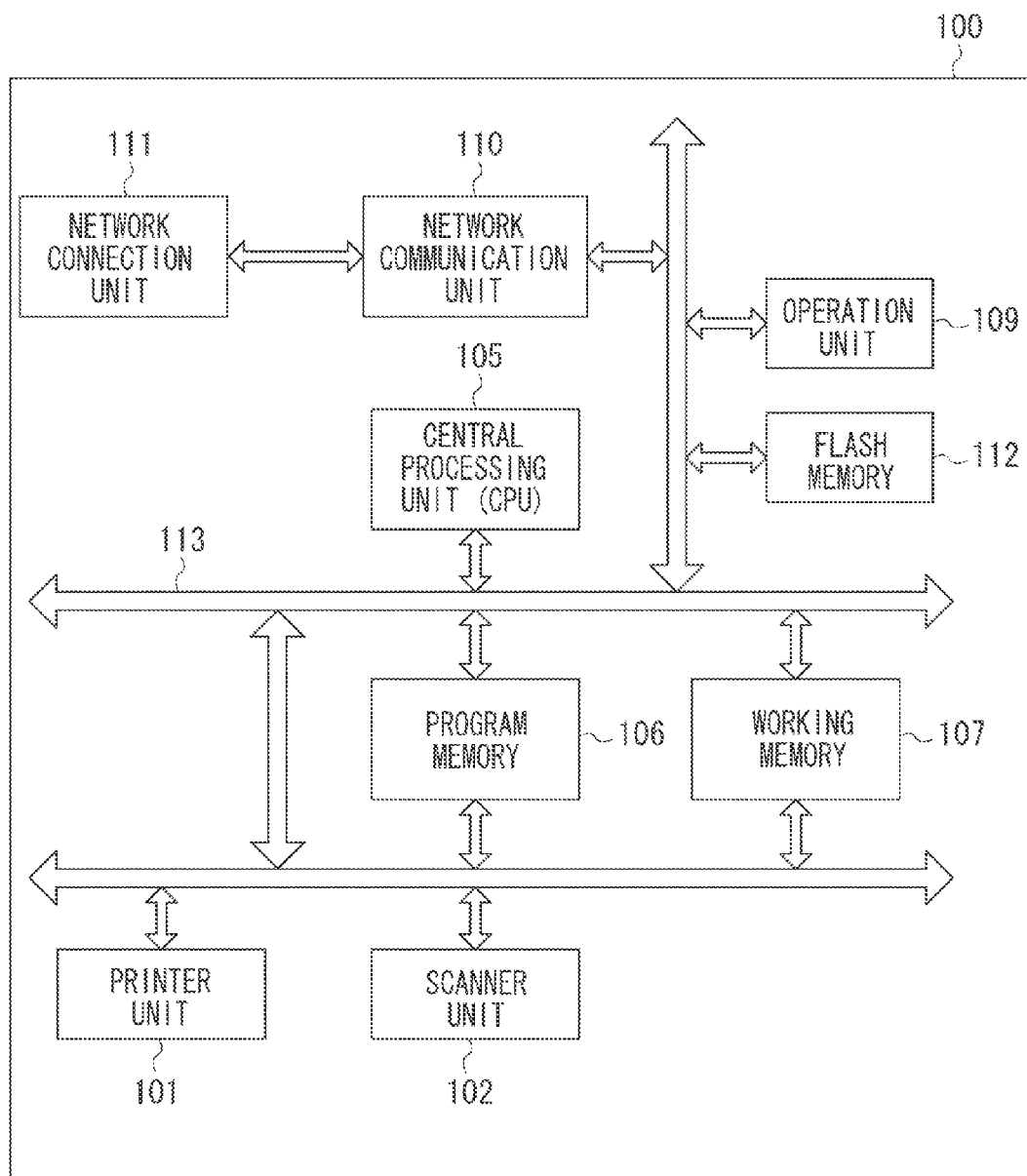
FIG. 1 illustrates a configuration of an image reading apparatus.

FIG. 1 illustrates a configuration of the image reading apparatus 100. The image reading apparatus 100 includes both a printer function and a scanner function and can provide the services of these functions over a local area network (LAN), a wide area network (WAN), or some other networks.

In the image reading apparatus 100, the printer function is realized by a printer unit 101 and the scanner function is realized by a scanner unit 102. The printer unit 101 prints, on a print sheet, print data received from the outside or image data stored in a memory card 104, according to an inkjet method or an electrophotographic method. The scanner unit 102 optically reads a document sheet placed on a platen and converts the resultant optical data into electronic data. A central processing unit (CPU) 105 converts this electronic data into data in a specified file format and can transmit the data to an external device over a network by controlling a network communication unit 110 that will be described below.

The image reading apparatus 100 includes the CPU 105 that controls individual functional sections and a program memory 106, such as a read only memory (ROM), that stores program codes to be read by the CPU 105. In addition, the image reading apparatus 100 further includes a working memory 107, such as a random access memory (RAM), that temporarily stores or buffers, for example image data when the image reading apparatus 100 performs various services.

The CPU 105 executes, on the working memory 107, programs which are stored in the program memory 106, so that the image reading apparatus 100 can perform various processes. For example, the CPU 105 controls the printer unit 101, the scanner unit 102, and the network communication unit 110 so that the printer function, the scanner function and transmitting/receiving data over the network can be realized.

The image reading apparatus 100 includes an operation unit 109 having, for example various buttons, a touchpad, or a touch panel. Furthermore, the image reading apparatus 100 includes the network communication unit 110 that connects to the network, thereby allowing for various communications and a network connection unit 111 that connects the network communication unit 110 to network media. The network communication unit 110 supports at least either a wired LAN or a wireless LAN. If the network communication unit 110 supports the wired LAN, the network connection unit 111 may be implemented using a connector via which a wired LAN cable is connected to the image reading apparatus 100. If the network communication unit 110 supports the wireless LAN, the network connection unit 111 may be implemented using an antenna.

The image reading apparatus 100 may include a display unit that displays various pieces of information. If the operation unit 109 has a touch panel, the operation unit 109 and the display unit may be integrated with each other.

The image reading apparatus 100 includes a nonvolatile flash memory 112 that stores transmission source information, for example, about packets received by the network communication unit. The above components included in the image reading apparatus 100 are connected to each other by a signal line 113.

The scanner unit 102 in the image reading apparatus 100 has an ADF. This ADF can automatically feed a plurality of document sheets one by one to a position where a reading sensor is disposed in the scanner unit 102. The ADF enables the scanner unit 102 to read a plurality of document sheets with a single read instruction. This can eliminate the necessity for a user to place the document sheets on the platen and give instructions multiple times.

A user can cause the scanner unit 102 to sequentially read a plurality of document sheets, for example by placing the document sheets in the ADF and then giving a scan instruction to the information processing apparatus 200 or the image reading apparatus 100. Then, the image reading apparatus 100 acquires a plurality of read images and then transmits the read images to the outside over the network connection unit 111 and the network, such as a LAN and a WAN.

The ADF sometimes only supports an operation of one-sided reading but does not support an operation of two-sided reading. In such a case, to read both sides of document sheets with the scanner unit 102, a user needs to cause the scanner unit 102 to sequentially read the front sides of the document sheets, then place the document sheets in the ADF again, and cause the scanner unit 102 to sequentially read the back sides of the document sheets.

Suppose the scanner unit 102 reads three document sheets with data for pages 1 to 6 printed on both pages. More specifically, the pieces of data for pages 1, 3, and 5 are printed on the front sides of the document sheets, whereas the pieces of data on pages 2, 4, and 6 are printed on the back sides. At first, the scanner unit 102 reads the pieces of data on pages 1, 3, and 5 in this order. After that, the three document sheets are ejected one by one to a document discharge unit in the ADF, and are stacked in the same sequence as before the front sides are read. Assuming that the scanner unit 102 reads the back sides of the document sheets in an ascending sequence, a user needs to turn over each of the three document sheets. However, this may impose an inconvenience to the user. For this reason, the image reading apparatus 100 sequentially reads the front sides in an ascending sequence, but the back sides in the reverse sequence.

The image reading apparatus 100 transmits the read images of pages 1, 3, and 5 and then the read images of pages 6, 4, and 2 in this order to the information processing apparatus 200. The information processing apparatus 200 can merge the six page images and cause the display unit 205 to display the six page images arranged according to the page number or create a file, such as a portable document format (PDF) or tagged image file format (TIFF) file, having a plurality of pages containing the six page images.

However, if three document sheets have data for five pages, for example, the back side of the third document sheets, which corresponds to the sixth page, is blank. In such a case, a user may remove the third document sheet from the targets to be read during the operation of reading the back sides; this will be referred to as a "first case." Any factor in interrupting the operation of reading the back sides, such as a cancel instruction or an error, may arise; this case will be referred to as a "second case." In either of the first and second cases, the number of read images of the back sides does not reach the number (three) of read images of the front sides. Moreover, in the first and second cases, the pages of read images transmitted to the information processing apparatus 200 become different from the original.

For example, the read back-side images of pages 6, 4, and 2 would be transmitted in this order. However, in the first case, more specifically when the last document sheet has been removed, the read images of pages 4 and 2 may be transmitted. In the second case, more specifically when any factor in interrupting the operation of reading the third document sheet arises, the read images of pages 6 and 4 may be transmitted. If the information processing apparatus 200 performs a process for dealing with the first case although the second case actually happens, the sequence of the five read images may be determined such that pages 1, 4, 3, 6, and 5 are arranged in this order.

The information processing apparatus 200 according to the present exemplary embodiment determines the sequence of read images, based on whether any factor in interrupting an operation of reading back sides has arisen. More specifically, when any interrupting factor arises, the information processing apparatus 200 performs a process for dealing with the second case and thus determines the sequence of the read images such that pages 1, 3, 4, 5, and 6 are arranged in this order. When no interrupting factors arise, the information processing apparatus 200 performs a process for dealing with the first case and thus determines the sequence of the read images such that pages 1, 2, 3, 4, and 5 are arranged in this order. Details of the process for determining a sequence will be described below.

Figure 2:
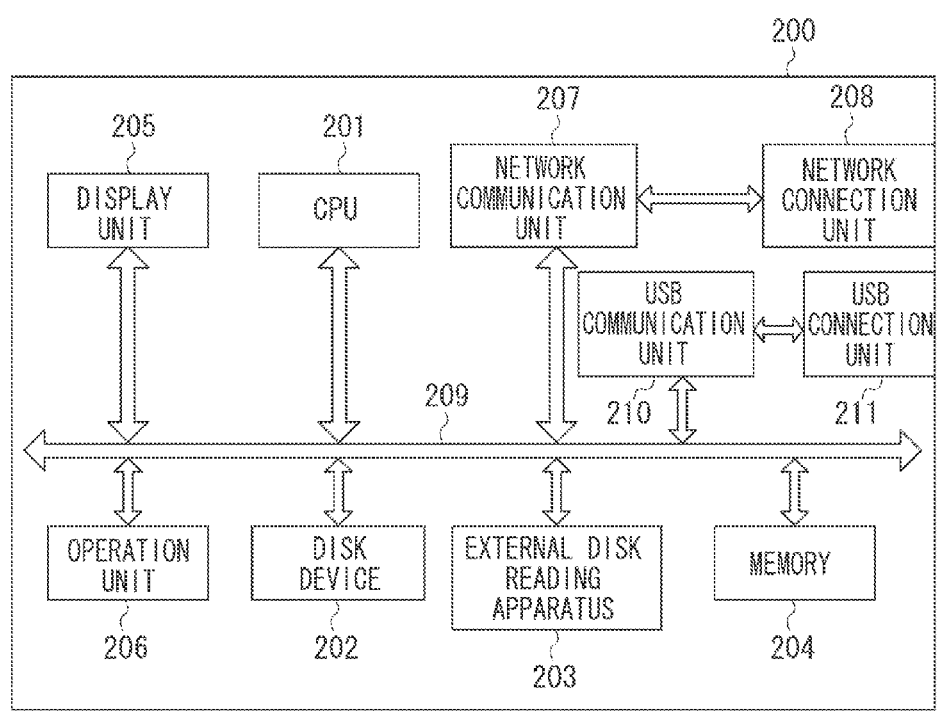
FIG. 2 illustrates a configuration of an information processing apparatus.

Next, a description will be given of a configuration of the information processing apparatus 200 to which the image reading apparatus 100 is connectable. FIG. 2 illustrates a configuration of the information processing apparatus 200. This information processing apparatus 200 may be implemented using information equipment, such as a personal computer (PC), a smartphone, a tablet, a portable phone, or a digital camera.

In FIG. 2, a CPU 201 controls individual sections in the information processing apparatus 200. A disk device 202 stores various types of files. An application program, an operating system (OS), and any other programs invoked by the CPU 201 are to be installed in this disk device 202. An external disk reading apparatus 203 reads contents in compact disc (CD)-ROMs and other external storage media. A memory 204 temporarily stores or buffers data in response to a request from the CPU 201.

The CPU 201 can perform various processes of the information processing apparatus 200 by executing programs on the memory 204 which are stored in the disk device 202.

A display unit 205 is implemented using an liquid crystal display (LCD), for example. An operation unit 206 is implemented using a keyboard, a mouse, a touchpad, or a touch panel, for example. If the information processing apparatus 200 includes a touch panel, the display unit 205 and the operation unit 206 may be integrated with each other. Both the display unit 205 and the operation unit 206 do not necessarily have to be incorporated into the information processing apparatus 200. Alternatively, the display unit 205 and the operation unit 206 may be external devices that are connectable to the information processing apparatus 200 via interfaces, such as universal serial bus (USB) interfaces. If the information processing apparatus 200 is implemented using a PC, this PC is connectable to a mouse, a keyboard, other external operation devices, and an external display unit.

A network communication unit 207 allows the information processing apparatus 200 to connect to the network and to conduct various communications. A network connection unit 208 allows the network communication unit 207 to connect to network media. Both the network communication unit 207 and the network connection unit 208 support at least either a wired LAN or a wireless LAN, similar to the image reading apparatus 100. More specifically, the network communication unit 207 and the network connection unit 208 are equipped with a function and a configuration required for wired or wireless LAN communication, similar to the network communication unit 110 and the network connection unit 111 in the image reading apparatus 100. A signal line 209 is for connecting the components to each other in the information processing apparatus 200. A USB communication unit 210 is used for causing the information processing apparatus 200 to communicate with various peripheral devices via a USB interface. A USB connection unit 211 may be implemented using a USB connector.

Figure 3:
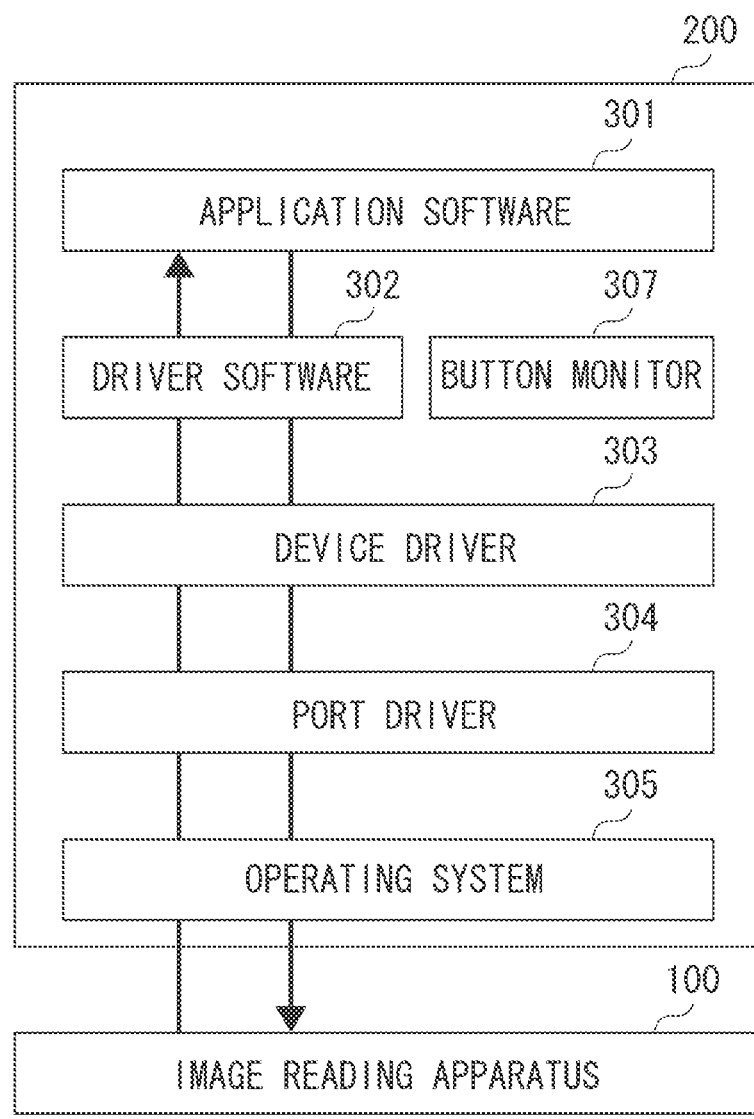
FIG. 3 illustrates a software configuration of the information processing apparatus.

Next, a description will be given of a software configuration of the information processing apparatus 200. FIG. 3 illustrates a software configuration of the information processing apparatus 200 which is used for controlling the image reading apparatus 100. Components illustrated in FIG. 3 correspond to program modules stored in the disk device 202. The CPU 201 can realizes the functions illustrated in FIG. 3 by executing these program modules.

An application software 301 uses the TWAIN or windows image acquisition (WIA), which is an image input application program interface (API), or an API conforming to vendor-specific specifications. The application software 301 sets scan parameters, including a scanning method, a color, and a resolution, in driver software 302, and then gives the driver software 302 an instruction of acquiring images. The application software 301 has functions of setting various parameters of the image reading apparatus 100 through the operation unit 109 and storing various format files in the memory 204 or the disk device 202. The driver software 302 can provides images acquired from the image reading apparatus 100 to the application software 301 and display a specific graphic user interface (GUI). The GUI has functions of setting parameters, including a review, a crop area of a preview image, a resolution, a reading mode (binary, 8-bit multiple value, 24-bit multiple value, etc.), and a color adjustment (gamma correction, for example). A device driver 303 acquires read images by transmitting a control command for controlling firmware incorporated into the image reading apparatus 100 to the image reading apparatus 100 and causing the image reading apparatus 100 to read document sheets. If no firmware is incorporated into the image reading apparatus 100, the CPU 201 may access control registers for modules in the image reading apparatus 100. Then, the CPU 201 may control shading, a motor speed according to a resolution or a crop area, a process for transmitting gamma correction data from the driver software 302 to the image reading apparatus 100, and a flow of reading images. A port driver 304 controls communication with the image reading apparatus 100 according to an interface, such as a parallel interface, a USB interface, an interface conforming to IEEE 1394 or a small computer system interface (SCSI), a wired LAN, or a wireless LAN. An operating system (OS) 305 operates in the information processing apparatus 200.

A process in the information processing apparatus 200 according to the present exemplary embodiment will be described with reference to FIGS. 4 and 5. The CPU 201 in the information processing apparatus 200 operates the program modules that have been described with reference to FIG. 3 whereby the processes depicted in FIGS. 4 and 5 is realized.

Figure 4:
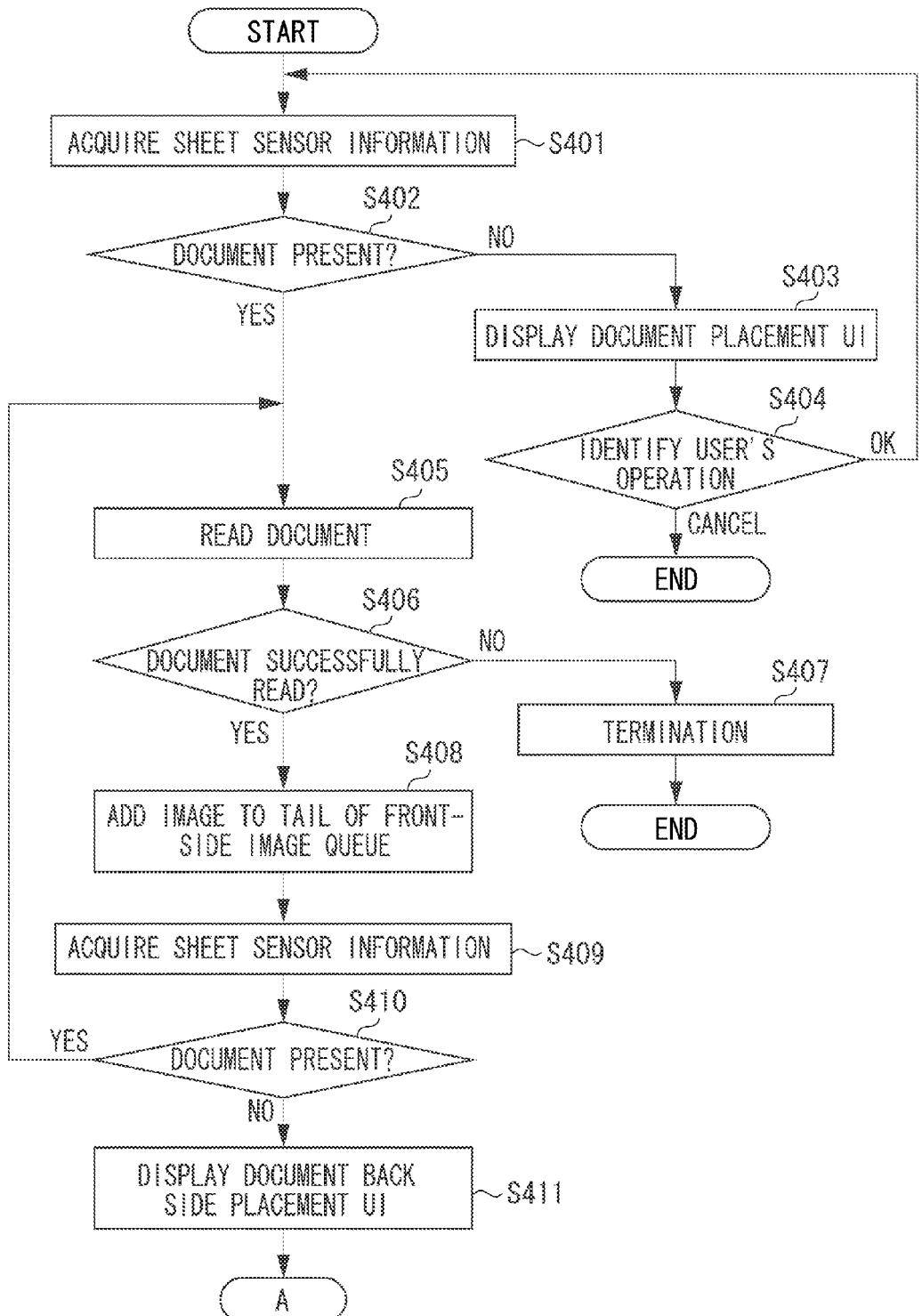
FIG. 4 is a flowchart of a process performed by the application software.
Figure 5:
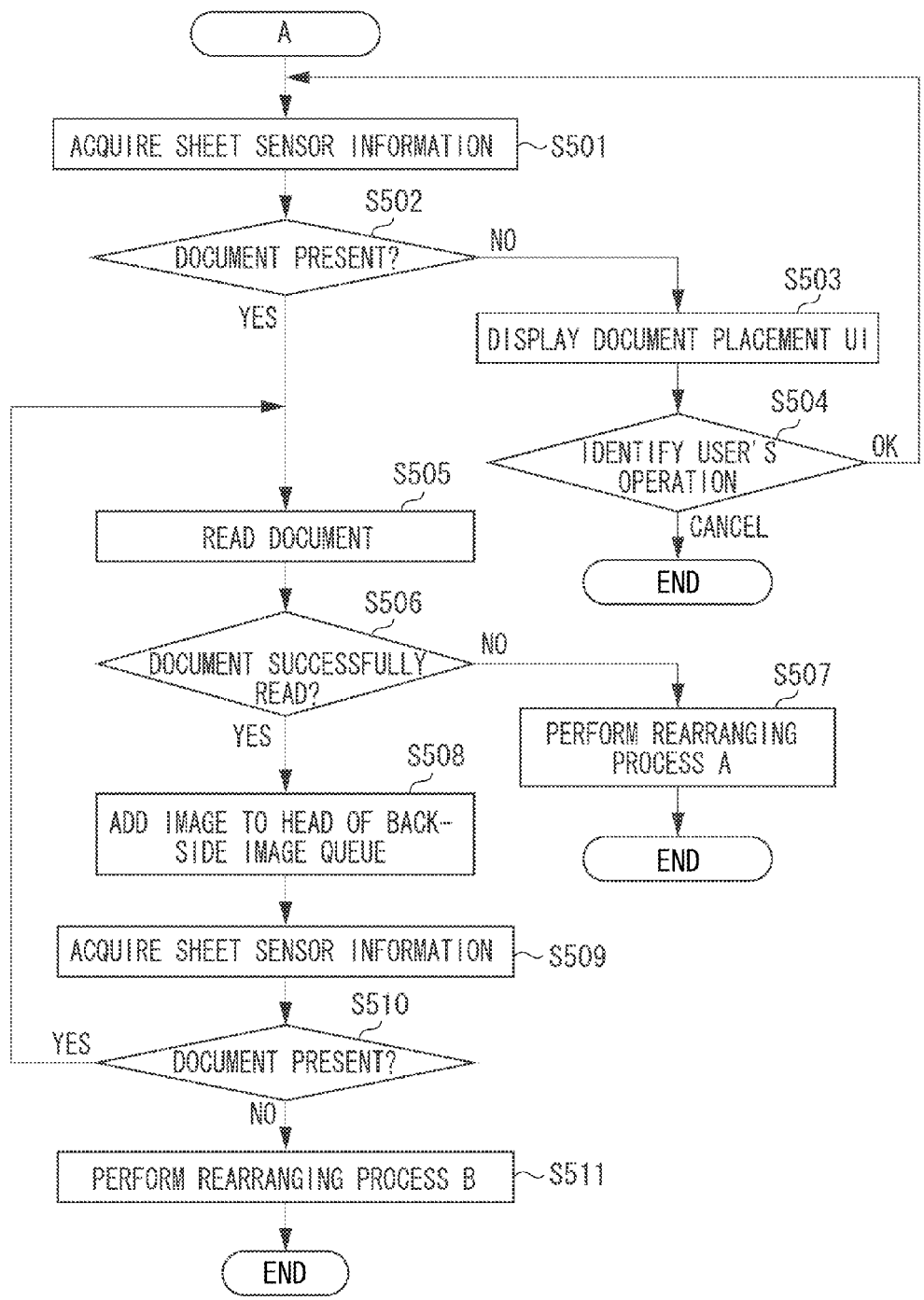
FIG. 5 is a flowchart of the process performed by the application software.

FIGS. 4 and 5 are flowcharts of the process performed by the application software 301. The process illustrated in FIG. 4 is performed when a user gives the application software 301 an instruction of two-sided reading in the ADF. More specifically, the process is performed, for example when a user sets a reading mode on a screen of the display unit 205 through the application software 301 and issues the application software 301 a reading instruction.

In step S401 in FIG. 4, the information processing apparatus 200 communicates with the image reading apparatus 100 and acquires sheet sensor information. The ADF in the image reading apparatus 100 is provided with a sensor that detects whether any sheet is present or whether the cover in a feeding unit is in an opened or closed state. The information processing apparatus 200 acquires the sheet sensor information, which is a detection result of the sensor, from the image reading apparatus 100 in step S401. From this sheet sensor information, the information processing apparatus 200 determines whether any document sheet is placed in the ADF.

In step S402, in a case where the sheet sensor information acquired in step S401 indicates that a document sheet is placed in the ADF (YES in step S402), the processing proceeds to step S405. in a case where the sheet sensor information indicates that no document sheets are placed in the ADF (NO in step S402), the processing proceeds to step S403.

Figure 8:
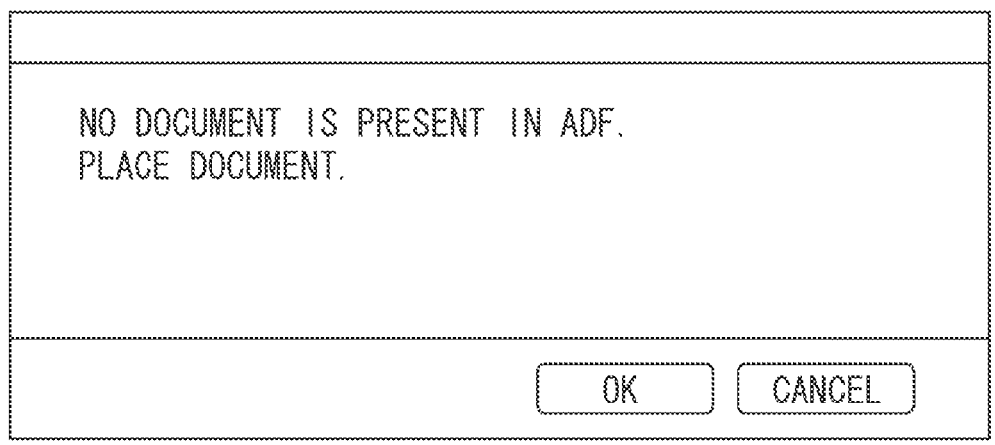
FIG. 8 illustrates an example of document placement user interface (UI).

In step S403, the information processing apparatus 200 prompts a user to place a document sheet in the ADF by displaying a document placement UI. FIG. 8 illustrates an example of a document placement user interface (UI), which is displayed by the display unit 205. When the user operates the operation unit 206 and presses either an OK button or a cancel button of the UI illustrated in FIG. 8, the processing proceeds to step S404. Alternatively, the UI illustrated in FIG. 8 may be displayed by the display unit in the image reading apparatus 100. More specifically, in a case where the image reading apparatus 100 determines that no document sheets are placed based on the sheet sensor information, the CPU 105 in the image reading apparatus 100 may cause its display unit to display the UI. Alternatively, both of the display unit 205 in the information processing apparatus 200 and the display unit in the image reading apparatus 100 may display the UI.

In step S404, the information processing apparatus 200 determines whether the user operates the operation unit 206. The processing is branched depending on the determination result. In a case where the user presses the OK button ("OK" in step S404), the processing returns to step S401. In a case where the user presses the cancel button ("CANCEL" in step S404), the information processing apparatus 200 terminates the processing, namely, the process for reading a document sheet in the ADF. If the UI is displayed by the display unit in the image reading apparatus 100, the user may enter an OK or cancel instruction in the operation unit 109 in the image reading apparatus 100. In this case, the instruction is transferred from the image reading apparatus 100 to the information processing apparatus 200.

The processing procedures of steps S401 to S404 described above enable a document sheet to be placed in the ADF and the processing to proceed to step S405.

In step S405, the image reading apparatus 100 reads a document sheet placed in the ADF, and the information processing apparatus 200 thereby acquires the resultant read image. When two-sided reading with the ADF is performed, the image reading apparatus 100 first reads the front sides of the document sheets in an ascending sequence. Accordingly, upon performing step S405, the image reading apparatus 100 at first acquires the read image of page 1 on the front side. After completely reading the document sheet, the image reading apparatus 100 transmits a status indicating the completion of the reading operation to the information processing apparatus 200. In a case where any error occurs due to, for example an occurrence of a paper jam in the ADF, the image reading apparatus 100 transmits an error status to the information processing apparatus 200.

In step S406, the information processing apparatus 200 branches the processing, depending on the status received from the image reading apparatus 100. In a case where the status that indicates the completion of the reading operation is received (YES in step S406), the processing proceeds to step S408. In a case where a status that indicates a reading failure, that is, an error status is received or in a case where a status that indicates the reception of a cancel instruction from the user is received (NO in step S406), the processing proceeds to step S407. In a case of any error, such as a memory reservation error, occurring in the information processing apparatus 200, the processing proceeds to step S407.

In step S407, the information processing apparatus 200 terminates the processing. More specifically, in a case where a part of the reading operation has been completed, for example, the information processing apparatus 200 stores this operational result and prompts the user to perform a reading operation again. After that, the information processing apparatus 200 terminates the processing.

In step S408, the information processing apparatus 200 adds the read image acquired in step S405 to a front-side image queue 1001 at its tail. This front-side image queue 1001 is a memory area in the memory 204 or the disk device 202. The front-side image queue 1001 has a data structure to be used in a typical computational algorithm which allows images to be entered in or extracted from both the head and the tail. Details of the front-side image queue 1001 will be described below with reference to FIGS. 10A to 10D.

In step S409, the information processing apparatus 200 communicates with the image reading apparatus 100 and then acquires sheet sensor information. The processing procedure of step S409 is the same as the processing procedure of step S401.

In step S410, the information processing apparatus 200 identifies the sheet sensor information acquired in step S409. In a case where a document sheet is placed in the ADF (YES in step S410), the processing proceeds to step S405. In a case where no document sheets are placed in the ADF (NO in step S410), the processing proceeds to step S411. The processing procedures of steps S405 to S410 described above enable the front sides of all the document sheets placed in the ADF to be read. In step S408, the read image is added to the tail of the front-side image queue 1001. Thus, the read images of the document sheets are stored in the order in which the document sheets have been read.

Figure 10A:
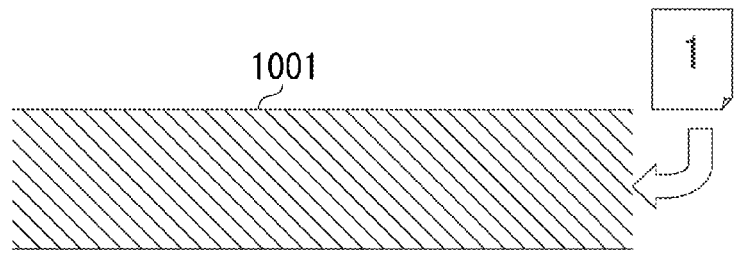
FIGS. 10A to 10D illustrate an example process for storing images acquired by reading the front sides of document sheets.

FIGS. 10A to 10D illustrate an example process for storing images acquired by reading the front sides of document sheets. More specifically, FIGS. 10A to 10D illustrate a process for adding read images to the tail of the front-side image queue 1001. The front-side image queue 1001 allows images to be entered in or extracted from both the head and the tail. FIG. 10A illustrates a process for adding the first read front-side image to the tail of the front-side image queue 1001. In this case, the first document sheet is read and thus the resultant image corresponds to the image of page 1.

Figure 10B:
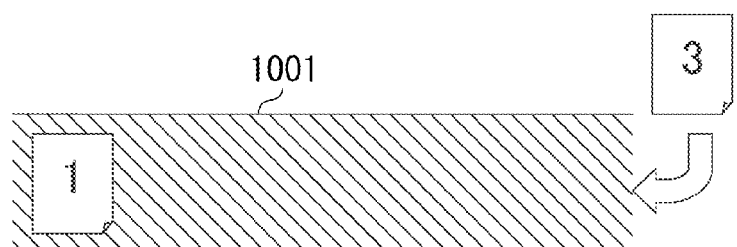
Figure 10C:
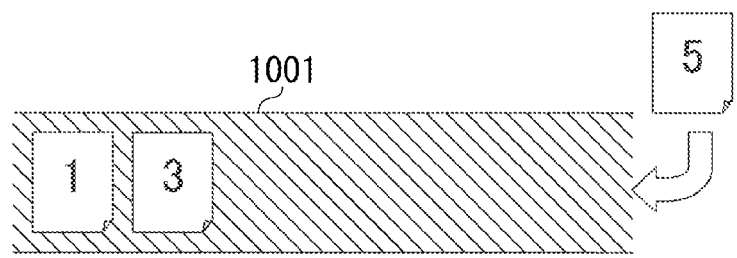
Figure 10D:
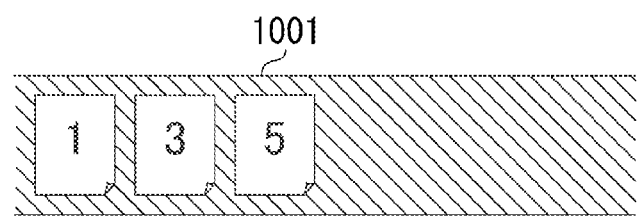

FIG. 10B illustrates a process for adding the second read front-side image to the tail of the front-side image queue 1001. It should be noted that the user designates two-sided reading mode with the ADF in the process of FIG. 4, and thus the read image of the front side of the second document sheet will be treated as the image of page 3. Therefore, as illustrated in FIG. 10B, the read image of the front side of the second document sheet is added, as the image of page 3, to the front-side image queue 1001 on the tail side of the image of page 1 that has been added in FIG. 10A. Likewise, as illustrated in FIG. 10C, the read image of the front side of the third document sheet is added to the tail of the front-side image queue 1001 as the image of page 5. The read images of the front sides are added one by one to the front-side image queue 1001 in step S408 until no document sheets have been determined to be placed in step S410 in FIG. 4. FIG. 10D illustrates the front-side image queue 1001 when no document sheets are determined to be placed in step S410 and the operation of reading the front sides is completed accordingly.

Figure 9:
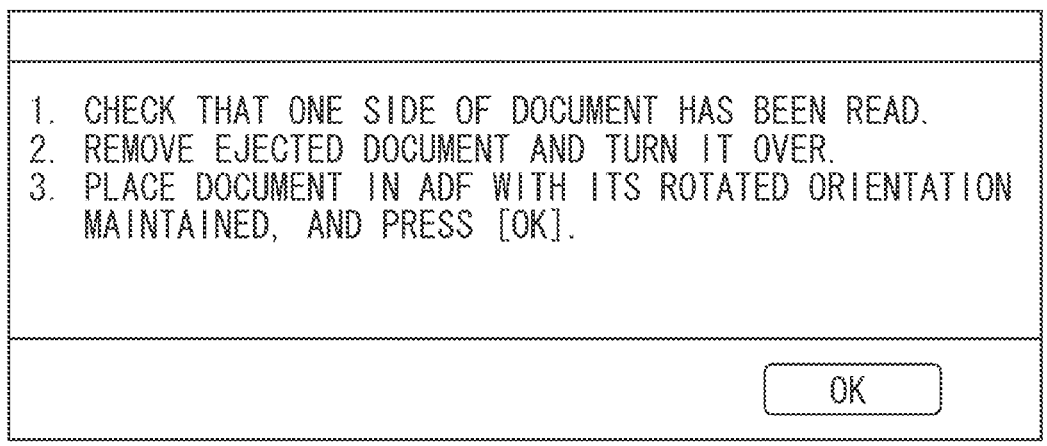
FIG. 9 illustrates an example of document back side placement UI.

After completing the operation of reading the front sides, in step S411, the information processing apparatus 200 causes the display unit 205 to display a document back side placement UI. FIG. 9 illustrates an example of document back side placement UI. For example the information processing apparatus 200 causes the display unit 205 to display the UI illustrated in FIG. 9. Alternatively, the UI illustrated in FIG. 9 may be displayed by the display unit in the image reading apparatus 100, similar to step S403.

The user follows the displayed content and places the document sheets, the front sides of which have been read, in the ADF in such a way that the back sides of the document sheets will be able to be read. Whereas the image reading apparatus 100 reads the front sides of the document sheets in an ascending sequence, that is, in the ascending sequence of the page number, the image reading apparatus 100 reads the back sides in a descending sequence, that is, in the reverse sequence of the page number.

In steps S501 to S504 in FIG. 5, the information processing apparatus 200 checks whether any document sheet is placed in the ADF and reports the absence of a document sheet to the user or performs a cancellation process. The processing procedures of steps S501 to S504 are the same as the processing procedures of steps S401 to S404, respectively and will not be described accordingly.

In step S505, the image reading apparatus 100 reads the back side of a document sheet placed in the ADF, and the information processing apparatus 200 thereby acquires the read image. In step S506, the image reading apparatus 100 branches the processing, depending on the received status. The processing procedures of steps S505 and S506 are the same as the processing procedures of steps S405 and S406, respectively and will not be described accordingly.

In a case where the image reading apparatus 100 receives a status that indicates the completion of the reading operation (YES in step S506), the processing proceeds to step S508. In a case where the image reading apparatus 100 receives a status that indicates the interruption of the reading due to an occurrence of an interrupting factor, such as an error or a read cancellation (NO in step S506), the processing proceeds to step S507. When the processing proceeds to step S507, the display unit 205 in the information processing apparatus 200 or the display unit in the image reading apparatus 100 displays a message. This message contains a guidance "document sheet is stuck in ADF. Open cover to remove document. Image read so far will be stored. Make additional reading edit to document," for example. If a factor in interrupting the reading operation, such as a memory reservation error, arises in the information processing apparatus 200, the processing also proceeds to step S507. There is no limitation on a factor in interrupting a reading operation. Alternatively, a factor in interrupting a reading operation may be a cancel instruction that the user issues to the information processing apparatus 200 via the operation unit 206 or the image reading apparatus 100 via the operation unit 109. Furthermore, if failing to communicate with the image reading apparatus 100 due to power shutdown of the image reading apparatus 100 or the disconnection of a session, for example, the information processing apparatus 200 may determine that a factor in interrupting a reading operation has arisen and the processing proceeds to step S507.

In step S507, the information processing apparatus 200 performs a rearranging process A, which is a method for determining the sequence of the read images contained in the front-side image queue 1001 or a back-side image queue 1101 that will be described below. The rearranging process A will be described below with reference to FIG. 6.

In step S508, the information processing apparatus 200 adds the image that has been read in step S505 to the head of the back-side image queue 1101. This back-side image queue 1101 is a memory area in the memory 204 or the disk device 202 of the information processing apparatus 200 and has the same data structure as the front-side image queue 1001 described above. However, a read image is added to the head of the back-side image queue 1101.

In step S509, the information processing apparatus 200 communicates with the image reading apparatus 100 and acquires sheet sensor information. The processing procedure of step S509 is the same as the processing procedure of step S501.

In step S510, the information processing apparatus 200 identifies the sheet sensor information acquired in step S509. In a case where the information processing apparatus 200 determines that a document sheet is placed in the ADF (YES in step S510), the processing returns to step S505. In a case where the information processing apparatus 200 determines that no document sheets are placed in the ADF (NO in step S510), the processing proceeds to step S511. In step S511, the information processing apparatus 200 performs a rearranging process B as a method for determining the sequence of the read images. In short, the information processing apparatus 200 performs the rearranging process B, in a case where no interrupting factors arise while the image reading apparatus 100 is reading the back sides of document sheets.

The processing procedures of steps S505 to S510 enable the back sides of all the document sheets placed in the ADF to be read. As described in step S411, the back sides of the document sheets are read in a descending sequence. Then, the resultant images are added to the head of the back-side image queue 1101 in step S508. Consequently, the read images are stored in the back-side image queue 1101 in the reverse order from the order in which the back sides of the document sheets have been read.

Figure 11A:
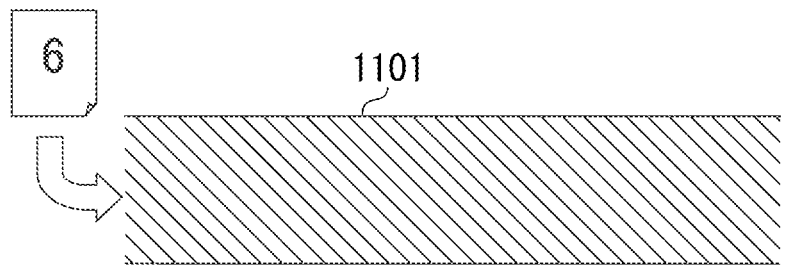
FIGS. 11A to 11C illustrate an example process for storing images acquired by reading the back sides of the document sheets.
Figure 11B:
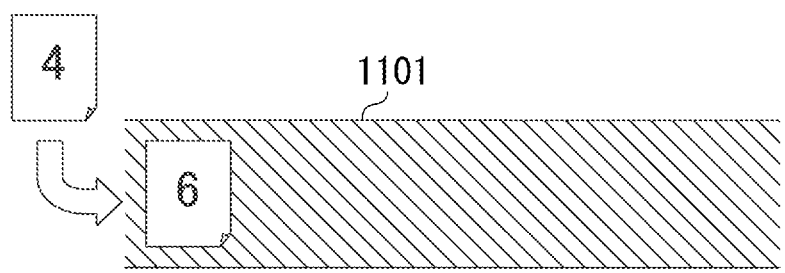
Figure 11C:
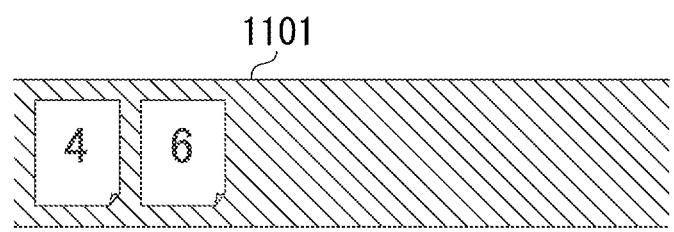

FIGS. 11A to 11C illustrate an example process for storing images acquired through an operation of reading back sides. More specifically, FIGS. 11A to 11C illustrate the back-side image queue 1101 when an interrupting factor arises during an operation of reading a plurality of document sheets. The back-side image queue 1101 allows images to be entered in or extracted from both the head and the tail. FIG. 11A illustrates a process for adding the read back-side image of the third document to the head of the back-side image queue 1101. In this example, the back side of the third document corresponds to the read image of page 6. FIG. 11B illustrates a process for adding the read back-side image of the second document sheet to the head of the back-side image queue 1101. In this example, a two-sided reading mode is set in the ADF in which single sides of document sheets are read. So, the back side of the second document corresponds to the read image of page 4. The read image of page 4 is added to the head of the back-side image queue 1101 on the head side of the read image of page 6 which has been added in FIG. 11A.

In the example illustrated in FIGS. 11A to 11C, suppose the read image of page 4 is acquired, and then the reading operation is interrupted due to an occurrence of an interrupting factor, such as an error, a cancel instruction, or a communication fault. More specifically, two document sheets are read and the resultant images are added to the back-side image queue 1101 in steps S505, S506, S508, S509, and S510. Then, the determination is performed in step S506 in FIG. 5. As a result of the determination, the processing proceeds to step S507. FIG. 11C illustrates the back-side image queue 1101 to which back-side images acquired until an interrupting factor has arisen are added.

In FIGS. 11A to 11C, the two back-side images are images of pages 4 and 6, respectively, for the sake of the convenience of an explanation. However, the information processing apparatus 200 cannot directly recognize to which page numbers the two back-side images correspond. Therefore, in a case where a factor in interrupting the operation of reading the back sides arises, the information processing apparatus 200 assesses the situation in which an operation of reading the back sides of document sheets is performed in the order from the last document (third document sheet in the example of FIGS. 11A to 11C) but this operation is interrupted. Then, the information processing apparatus 200 performs the rearranging process A.

A description will be given of the rearranging process A performed in step S507 in FIG. 5 with reference to FIGS. 6 and 12A to 12F. The rearranging process A is performed when an interrupting factor arises during an operation of reading the back sides of document sheets in the process in FIG. 5. The rearranging process A is a process for sequentially determining the sequential numbers of the read front-side images and the read back-side images in the sequence from the last ones of the read front-side images and the read back-side images at the tail. A reason for performing this process is that when an interrupting factor arises during an operation of reading back sides, images that have been acquired before occurring of the interrupting factor could be read in an appropriate state. With this process, back-side images that have been acquired before occurring of an interrupting factor can be arranged at appropriate locations with respect to the locations of front-side images. Details of the rearranging process A will be described below.

Figure 6:
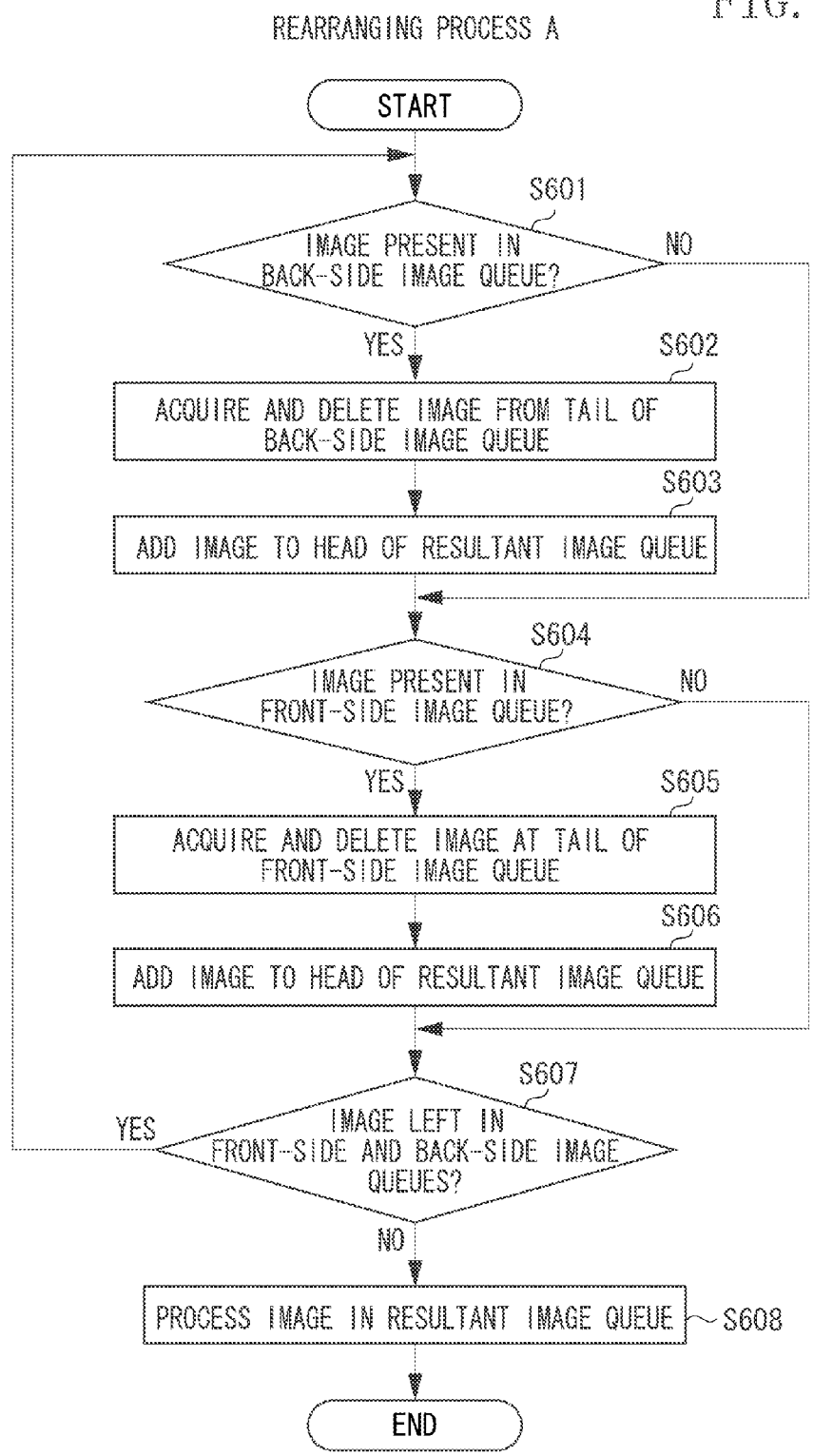
FIG. 6 is a detailed flowchart of a rearranging process.

FIG. 6 is a detailed flowchart of the rearranging process A.

In step S601, the information processing apparatus 200 checks whether any image is present in the back-side image queue 1101. In a case where an image is present (YES in step S601), the processing proceeds to step S602. In a case where no images are present (NO in step S601), the processing proceeds to step S604.

In step S602, the information processing apparatus 200 acquires the last image from the tail of the back-side image queue 1101. In this process, this image is deleted from the back-side image queue 1101.

In step S603, the information processing apparatus 200 adds the image acquired in step S602 to the head of a resultant image queue 1201. This resultant image queue 1201 is used for storing front-side images that have been stored in the front-side image queue 1001 and back-side images that have been stored in the back-side image queue 1101. The resultant image queue 1201 is provided in the memory 204 or the disk device 202 in the information processing apparatus 200, similar to the front-side image queue 1001 and the back-side image queue 1101.

FIGS. 12A to 12F illustrate an example process for storing read images in the resultant image queue 1201 during the rearranging process A.

FIG. 12A illustrates the state of the resultant image queue 1201 of when the processing procedures of steps S602 and S603 are performed one time on the queues. The information processing apparatus 200 acquires the image (image of page 6) from the tail of the back-side image queue 1101 and deletes this image from the tail of the back-side image queue 1101. Then, the information processing apparatus 200 adds the image of page 6 to the head of the resultant image queue 1201.

In step S604, the information processing apparatus 200 checks whether any image is present in the front-side image queue 1001. In a case where any image is present (YES in step S604), the processing proceeds to step S605. In a case where no images are present (NO in step S604), the processing proceeds to step S607.

In step S605, the information processing apparatus 200 acquires the last image from the tail of the front-side image queue 1001 and deletes this image from the front-side image queue 1001.

In step S606, the information processing apparatus 200 adds the image acquired in step S605 to the head of the resultant image queue 1201.

FIG. 12B illustrates the state of the resultant image queue 1201 of when the processing procedures of steps S605 and S606 has been performed on the queues illustrate in FIG. 12A. The information processing apparatus 200 acquires the image (image of page 5) from the tail of the front-side image queue 1001 and deletes this image from the tail of the front-side image queue 1001. Then, the information processing apparatus 200 adds the acquired image of page 5 to the head of the resultant image queue 1201. In this process, the image of page 6 has already been added to the resultant image queue 1201, and thus the image of page 5 is added to the head side of the image of page 6.

In step S607, the information processing apparatus 200 checks whether any image is left in either of the front-side image queue 1001 and the back-side image queue 1101. In a case where any image is left in either of the front-side image queue 1001 and the back-side image queue 1101 (YES in step S607), the processing returns to step S601. In a case where no images are left in both of the front-side image queue 1001 and the back-side image queue 1101 (NO in step S607), the processing proceeds to step S608.

In FIGS. 12A to 12F, a read image is added to the resultant image queue 1201, and then other read images are further added one by one thereto.

In steps S602 and S605, images are acquired from the tails of the back-side image queue 1101 and the front-side image queue 1001. In other words, the read images are acquired in a descending sequence. In steps S603 and S606, read back-side images and read front-side images are alternately added to the head of the resultant image queue 1201.

FIGS. 12C and 12D illustrate the state of the resultant image queue 1201 of when the processing procedures after step S601 has been performed on the queues illustrated in FIG. 12B. Referring to FIG. 12C, the image (image of page 4) is acquired from the tail of the back-side image queue 1101 and deleted this image from the back-side image queue 1101 in step S602, and then the image of page 4 is added to the head of the resultant image queue 1201 in step S603. Referring to FIG. 12D, the image (image of page 3) is acquired from the tail of the front-side image queue 1001 and deleted from the front-side image queue 1001 in step S605, and then the image of page 3 is added to the head of the resultant image queue 1201 in step S606.

FIG. 12E illustrates the state of the resultant image queue 1201 of when the processing procedures after step S601 has been performed on the queues illustrated in FIG. 12D. The back-side image queue 1101 stores no images, and thus the determination result in step S601 is "NO." Following this, the image (image of page 1) is acquired from the tail of the front-side image queue 1001 and deleted from the front-side image queue 1001 in step S605, and then the image of page 1 is added to the head of the resultant image queue 1201 in step S606.

FIG. 12F illustrates the state of the resultant image queue 1201 of when the processing procedure of step S607 is to be performed after the resultant image queue 1201 has been in the state illustrated in FIG. 12E. Referring to FIG. 12F, the read back-side images are inserted between the respective two out of the read front-side images. In addition, the read back-side images (images of pages 4 and 6) are inserted at appropriate locations. In this case, both the front-side image queue 1001 and the back-side image queue 1101 store no images and thus the determination result in step S607 is "NO." As a result, the processing proceeds to step S608.

In step S608, the information processing apparatus 200 performs a predetermined process on the images stored in the resultant image queue 1201. This predetermined process may be, for example a process for creating a file containing the images stored in the resultant image queue 1201. If the file to be created is a PDF or TIFF file, for example, this file may contain the images stored in the resultant image queue 1201 as a plurality of pages. In addition, the file can be created such that the read images that have been stored in the resultant image queue 1201 are arranged in the ascending sequence of the page number. Referring to the example of FIG. 12F, the read images of pages 1, 3, 4, 5, and 6 are arranged in this order in the file. In this case, the page number of the file does not match the actual page number of the document sheets, because the read image of page 2 to 5 correspond to the document sheets of pages 3 to 6, respectively. However, the file can be created such that the sequence of the five read images matches the actual one.

During the above predetermined process in step S608, the information processing apparatus 200 may cause the display unit 205 to display the images stored in the resultant image queue 1201. In this case, the images displayed by the display unit 205 may be arranged according to the sequence of the resultant image queue 1201. For example the images displayed may be arranged in the above described order. Alternatively, the display unit 205 may display the images stored in the resultant image queue 1201 in a slide-show manner in which the displays of the images are switched one by one for a preset period. In this case, the sequence of the images displayed may be the same as that of the resultant image queue 1201. When images are displayed in the above manner, the actual sequence of five images (images of pages 1, 3, 4, 5, and 6) can be reflected in the display control. This allows for the display control according to an appropriate sequence.

During the above predetermined process, the printer unit 101 included in the image reading apparatus 100 may also print the plurality of read images in the above sequence. For example the printer unit 101 may print the images over a single print sheet in an index print format so that the images are arranged in the above sequence. Alternatively, the printer unit 101 may print the images one by one over the print sheet.

In step S608, since any back side image, or read image of page 2 of the document sheet, is absent in step S608, the display unit 205 may display a message that prompts the user to place page 2 of the document sheet.

As described above, the rearranging process A illustrated in FIG. 6 performed by the information processing apparatus 200 enables read back-side images to be rearranged in the sequence of the page number in order from the last read back-side image at the tail. Consequently, if any given read back-side image on the head side is absent due to an occurrence of a read interrupting factor, such as an error, a cancel instruction, or a communication fault, during the control of an operation of reading back sides, read front-side images and read back-side images can be rearranged in the appropriate sequence of the page number.

Next, a description will be given of the rearranging process B performed by the information processing apparatus 200 in step S511 in FIG. 5. As described above, the rearranging process B is performed if no interrupting factors arise until all document sheets placed in the ADF have been read. Suppose the image reading apparatus 100 reads the front sides of document sheets, then the user removes a document sheet, and the image reading apparatus 100 reads the back sides of the remaining document sheets. If the above operation of reading the back sides is not interrupted until this operation has been completed, the information processing apparatus 200 performs the rearranging process B.

Details of the rearranging process B will be described with reference to FIGS. 7 and 13A to 13C. The rearranging process B is performed if no interrupting factors arise until the back sides of document sheets have completely been read in the processing of FIG. 5. The rearranging process B is a process for sequentially determining the sequential numbers of the read front-side images and the read rear-side images in the order from the first ones at the head. A reason for performing this process is that if no interrupting factors arise throughout an operation of reading the back sides of document sheets, there is a possibility that the user may remove any given document sheet but the document sheets preceding the removed document sheet could have been read successfully. The process for determining the sequence of images uses the first image sheet at the head as the reference. With this process, the front-side images and back-side images can be arranged at appropriate locations if the user removes the last one from document sheets during an operation of reading the back sides of the document sheets. Details of the rearranging process B will be described below.

Figure 13A:
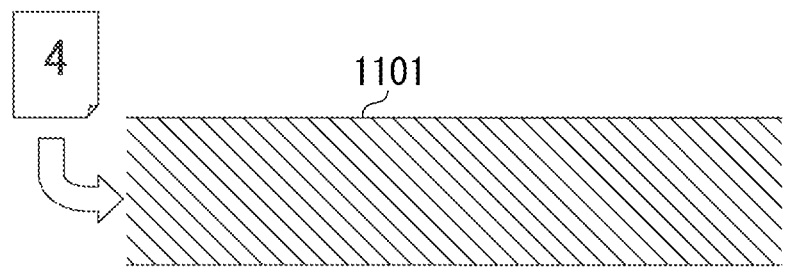
FIGS. 13A to 13C illustrate another example process for storing images acquired by reading the back sides of the document sheets.
Figure 13B:
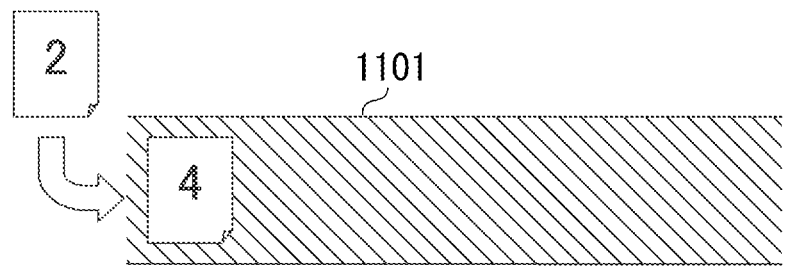
Figure 13C:
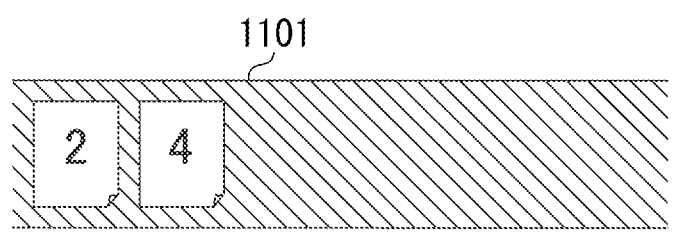

FIGS. 13A to 13C illustrate an example process for storing images acquired through an operation of reading back sides. More specifically, FIGS. 13A to 13C illustrate the back-side image queue 1101 when the last document sheet is removed and no read interrupting factors arise. Suppose the third document, or the last document, is removed from document sheets during an operation of reading the back sides. If data for odd numbered pages (e.g., five pages) is printed on both pages of the document sheets, the back side of the last document sheet is blank. Accordingly, there is a possibility that the user may remove the last document sheet during the operation of reading the back sides.

In FIG. 13A, the second back-side image is added to the head of the back-side image queue 1101. The read image first acquired through the operation of reading back sides would correspond to the back-side image of the third document sheet, but actually corresponds to the image of page 4, because the third document sheet has been removed. In FIG.

13B, the next back-side image is added to the head of the back-side image queue 1101. This back-side image corresponds to the back side of the first document sheet and thus corresponds to the image of page 2. The image of page 2 is added to the head of the back-side image queue 1101 on the head side of the image of page 4 that has been added in FIG. 13A. In FIG. 13C, the read back-side images have been completely added to the back-side image queue 1101.

In FIGS. 13A to 13C, the two back-side images are indicated as page 2 and 4, respectively, for the sake of the convenience of an explanation. However, the information processing apparatus 200 cannot directly recognize to which page numbers the two back-side images correspond. If no factors in interrupting the operation of reading the back sides arise, the information processing apparatus 200 assesses the situation in which the last document sheet may have been removed, and thus performs the rearranging process B.

The rearranging process B will be described with reference to FIGS. 7 and 14A to 14F. The rearranging process B is a process for acquiring images from the heads of the front-side image queue 1001 and the back-side image queue 1101 and storing the images in the resultant image queue 1201 at its tail.

Figure 7:
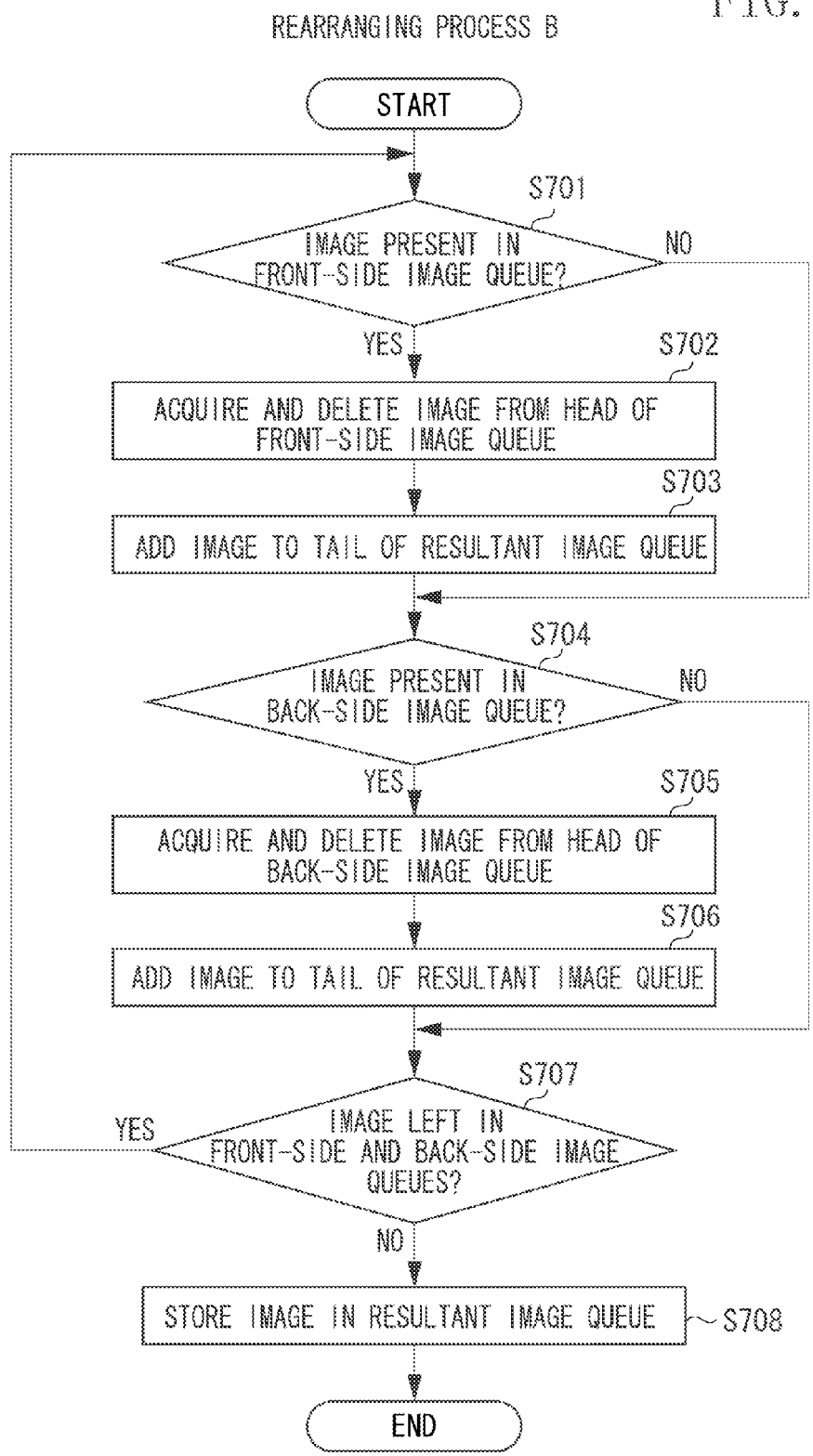
FIG. 7 is a detailed flowchart of a rearranging process.

FIG. 7 is a detailed flowchart of the rearranging process B. FIGS. 14A to 14F illustrate an example process for storing read images in the resultant image queue 1201 during the rearranging process B.

In step S701, the information processing apparatus 200 checks whether any image is present in the front-side image queue 1001. In a case where any image is present (YES in step S701), the processing proceeds to step S702. In a case where no images are present (NO in step S701), the processing proceeds to step S704.

In step S702, the information processing apparatus 200 acquires the first image from the head of the front-side image queue 1001. Then, the information processing apparatus 200 deletes this image from the front-side image queue 1001.

In step S703, the information processing apparatus 200 adds the image acquired in step S702 to the tail of the resultant image queue 1201.

FIG. 14A illustrates the resultant image queue 1201 of when the processing procedures of steps S702 and S703 are performed one time. The image (image of page 1) is acquired from the head of the front-side image queue 1001 and deleted therefrom. Then, the image of page 1 is added to the tail of the resultant image queue 1201.

In step S704, the information processing apparatus 200 checks whether any image is present in the back-side image queue 1101. In a case where any image is present (YES in step S704), the processing proceeds to step S705. In a case where no images are present (NO in step S704), the processing proceeds to step S707.

In step S705, the information processing apparatus 200 acquires the first image from the head of the back-side image queue 1101. Then, the information processing apparatus 200 deletes this image from the back-side image queue 1101.

In step S706, the information processing apparatus 200 adds the image acquired in step S705 to the tail of the resultant image queue 1201.

FIG. 14B illustrates the state of the resultant image queue 1201 of when the processing procedures of steps S705 and S706 have been performed on the queues. The image (the image of page 2) is acquired from the head of the back-side image queue 1101 and deleted therefrom. Then, the image of page 2 is added to the tail of the resultant image queue 1201. In this case, the image of page 1 has already been added to the resultant image queue 1201, and thus the image of page 2 is added thereto on the tail side of the resultant image queue 1201.

In step S707, the information processing apparatus 200 checks whether any image is left in either of the front-side image queue 1001 and the back-side image queue 1101. If any image is left in either of the front-side image queue 1001 and the back-side image queue 1101 (YES in step S707), the processing proceeds to step S701. If no images are left in both of the front-side image queue 1001 and the back-side image queue 1101 (NO in step S707), the processing proceeds to step S708. The above processing is repeated until no images have been left in both the front-side image queue 1001 and the back-side image queue 1101. In this way, images are acquired from the heads of the front-side image queue 1001 and the back-side image queue 1101 in steps S702 and S705. Then, these images are added to the tail of the resultant image queue 1201 in steps S703 and S706. Consequently, the read front-side images and the read back-side images are stored in the resultant image queue 1201 in a descending sequence.

FIG. 14C illustrates the state of the resultant image queue 1201 of when the processing procedures of steps S702 and S703 have been again performed on the queues illustrated of FIG. 14B. The image (image of page 3) is acquired from the head of the front-side image queue 1001 and deleted therefrom. Then, the image of page 3 is added to the tail of the resultant image queue 1201. Likewise, when the processing procedures of steps S705 and S706 are again performed on the resultant image queue 1201 as illustrated in FIG. 14D, the image (image of page 4) is acquired from the head of the back-side image queue 1101 and deleted therefrom. Then, the image of page 4 is added to the tail of the resultant image queue 1201.

When the processing procedures of steps S702 and S703 are performed on the queues in the state illustrated in FIG. 14D, as illustrated in FIG. 14E, the image (image of page 5) is acquired from the head of the front-side image queue 1001 and deleted therefrom. Then, the image of page 5 is added to the tail of the resultant image queue 1201.

As a result of the above processing, the resultant image queue 1201 becomes the state illustrated in FIG. 14F. As illustrated in FIG. 14F, the read back-side images are inserted between respective two out of the read front-side images. It can be seen that the read back-side images (image of pages 4 and 6) are inserted at appropriate locations. In this case, no images are left in both the front-side image queue 1001 and the back-side image queue 1101. Therefore, The determination result in step S707 is "NO". As the determination result in step S707, the processing proceeds to step S708.

In step S708, the information processing apparatus 200 performs a predetermined process on the images stored in the resultant image queue 1201 according to the sequence of arranging the images in the resultant image queue 1201. Examples of the predetermined process include processes of creating a file containing a plurality of images, and displaying the images, and printing the images, similar to step S608 in FIG. 6.

The rearranging process B described above illustrated in FIG. 7 enables read front-side images and read back-side images to be rearranged in an orderly sequence with respect to the first page. Assuming that the user removes the last one from the document sheets before the image reading apparatus 100 reads the back sides of document sheets placed in the ADF so that the number of the back-side images is smaller than the number of the front-side images, the rearranging process B enables these images to be rearranged in an appropriate sequence of the page number.

The rearranging process B described above illustrated in FIG. 7 is also performed if the user removes no document sheets. In this case, the rearranging process B can also determine appropriately the sequence of read front-side images and read back-side images. If the image reading apparatus 100 reads the front and back sides of three document sheets, for example, the information processing apparatus 200 can determine appropriately the sequence of the images of pages 1 to 6 stored in the resultant image queue 1201 such that the images of pages 1, 2, 3, 4, 5, and 6 are arranged in this order.

When no factors in interrupting the back sides of document sheets arise, the information processing apparatus 200 can determine an appropriate sequence of images by performing the rearranging process B regardless of whether any document sheet has been removed. Therefore, the information processing apparatus 200 does not have to perform a process for comparing the numbers of read front-side images and read back-side images, and the sequence determination process can be performed at a light load.

According to the present exemplary embodiment described above, if any interrupting factor arises when the image reading apparatus 100 reads the back sides of document sheets in the ADF after having read the front sides, the information processing apparatus 200 performs the rearranging process A to determine the sequence of the front-side images and back-side images. If no interrupting factors arise when the back sides are read, the information processing apparatus 200 performs the rearranging process B to determine the sequence of the front-side images and back-side images.

In a case where the number of back side images is smaller than the number of front side images, the information processing apparatus 200 identifies whether the mismatch between both numbers is due to a factor in interrupting the reading operation. This can determine appropriately the sequence of the front-side images and the back-side images.

According to the present exemplary embodiment, in a case where an interrupting factor, such an error or a cancel instruction, arises while the image reading apparatus 100 is reading the back sides of document sheets in the ADF, for example, the information processing apparatus 200 alternately rearranges the front-side images and the back-side images in the order from the last ones, as illustrated in FIGS. 12A to 12E. This can determine appropriately the sequence of the front-side images and the back-side images, as illustrated in FIG. 12F.

Suppose a user removes the last one from the document sheets and places the remaining document sheets in the ADF, and then the image reading apparatus 100 reads the back sides of these document sheets. In a case where no interrupting factors arise, the information processing apparatus 200 alternately rearranges the front-side images and the back-side images in the order from the first ones as illustrated in FIGS. 14A to 14E. This can determine an appropriate sequence of the front-side images and the back-side images, as illustrated in FIG. 14F.

According to the present exemplary embodiment described above, it is possible to address a problem with the sequence of images when the number of read back-side images is smaller than the number of read front-side images. Furthermore, according to the present exemplary embodiment, it is possible to determine an appropriate sequence independently of the number of back-side images by employing the rearranging processes A and B. This can eliminate the need to perform a process for comparing the numbers of read front-side images and read back-side images, whereby the sequence determination process can be performed at a lighter load.

The present exemplary embodiment has been described regarding a case where a plurality of read back-side images are acquired. However, application of this embodiment is not limited to this case, and the embodiment is still applicable to a case where a single read back-side image is acquired. The embodiment is applicable to an exemplary case where the image reading apparatus 100 acquires the read front-side images of two document sheets but acquires only one read back-side image because a user removes the second document or an operation of reading the back side of the second document is interrupted. In this case, it is also possible to determine an appropriate sequence of two read front-side image and one read back-side images by choosing between the rearranging processes A and B depending on whether any interrupting factor has arisen.

The application software 301 described above may have a function of causing the image reading apparatus 100 to read an additional document sheet and inserting the sequential number of the read image (new image) of this additional document sheet between the sequential numbers of read images (preceding images) that have already been acquired. In this case, the application software 301 may cause the display unit 205 to display the preceding images and new read images arranged in a sequence. Then, a user may operate the operation unit 206 to drag the new read image to a position on the screen of the display unit 205 such that a desired sequential number is assigned to the new read image. Consequently, the new read image is inserted between the preceding images at the above position. Moreover, the application software 301 may have a function of editing PDF and TIFF files. With this function, the new read image can be added to a file containing the preceding read images. The user can assign a desired sequential number to the new read image and create a file in which the new read image appears on a desired page.

The application software 301 may have a function of allowing a user to change as desired the page sequence of preceding and new read images. For example the user may change the page sequence of any given read image by dragging this read image over the screen of the display unit 205. With this function, the sequence of the preceding and new read images can be set as desired.

Instead of the above drag operation, the operation of setting the sequence which is performed by the user may be clicking of a mouse at a position between two images or touching of the position on a touch panel. In response to this operation, the application software 301 may perform a process for adding the read image between the two adjacent read images. Alternatively, a user may request on which page (page number) the new read image is to be appear.

The present exemplary embodiment has been described regarding an exemplary case where images are stored in queues, including the front-side image queue 1001, the back-side image queue 1101, and the resultant image queue 1201. Further, a plurality of read images are rearranged according to a method for storing the images in the resultant image queue 1201. However, a method for storing images is not limited to the method using the queues. Alternatively, a memory having a predetermined memory area to which data is randomly writable may be used, and images may be stored in this memory in an orderly sequence.

The sequence of read images does not have to be specified by determining the sequence in which the read images are written to the memory, unlike the case of using the queues. Alternatively, the sequence of read images may be determined by, for example adding information that indicates the sequence of the read images to the memory. The application software 301 may refer to this information upon creating or displaying a file, and perform processing procedures in the sequence indicated by the information.

The present exemplary embodiment has been described regarding an exemplary case where the image reading apparatus 100 reads three document sheets. Assuming that an image reading apparatus reads the front and back sides of fifty document sheets, the image reading apparatus needs to read the documents one hundred times. Moreover, if the entire operation of reading the front and back sides of all the document sheets is cancelled due to an occurrence of an error, such as a paper jam, during the reading operation, the image reading apparatus needs to read the documents one hundred times again.

In the above example, assuming that fifty front-side images and forty nine back-side images are rearranged with the rearranging process B, an information processing apparatus may determine incorrectly the sequence of the forty nine back-side images. Provided that an application software 301 can change the sequence of a plurality of read images by using the above edit function, the application software 301 needs to change the sequential numbers of as many as the forty nine back-side images.

On the other hand, according to the present exemplary embodiment, the information processing apparatus 200 employs the rearranging process A if any interrupting factor arises like the above example. The information processing apparatus 200 can thereby determine an appropriate sequence of the fifty front-side images and the forty nine back-side images. In this case, a user can use an optional reading function of the application software 301 to cause the image reading apparatus 100 to read the back side of an additional document sheet again which the image reading apparatus 100 has failed to read due to an occurrence of a read error. This enables one hundred read front-side images and read back-side images in total to be acquired. At this point, the fifty front-side images and the forty nine back-side images that have been read previously are arranged in a determined sequence. Therefore, the user determines or changes the sequential number of the read image of the additional document sheet, whereby the sequence of one hundred read front-side images and read back-side images in total can be determined appropriately. Then, the user can create files and perform display control and print control in the determined sequence.

The present exemplary embodiment has illustrated that when a user causes the image reading apparatus 100 to read both sides of document sheets with an ADF for one-sided reading, the image reading apparatus 100 performs the process for reading the front sides in an ascending sequence and the back side in a descending sequence. However, there is no limitation on the sequences in which the image reading apparatus 100 reads the front or back sides of document sheets. Alternatively, the image reading apparatus 100 may read the back sides in an ascending sequence, for example. This can determine appropriately the sequence of a plurality of read images by employing the rearranging process B, regardless of whether any interrupting factor arises upon reading the back sides.

The present exemplary embodiment described above considers either one of cases where a user removes a document sheet and where any factor in interrupting an operation of reading back sides arises. However, there is a possibility that both of the cases may happen. Therefore, the display unit 205 may display a question in an operation of reading back sides, which asks whether a user has removed one or more document sheets at its end and how many document sheets the user has removed. The user may answer the question thorough the operation unit 206, and in response to the answer, the image reading apparatus 100 may start reading the back sides.

Suppose the user gives an answer that he or she has removed the last two document sheets after ten read front-side images are acquired, and then a factor in interrupting an operation of reading the back sides arises. The read back-side image that has been first acquired corresponds to the image of page 16. Accordingly, this image is handled as the image of page 16, and the rearranging process A is applied to the following read back-side images. Consequently, it is possible to determine an appropriate sequence of a plurality of read front-side images and back-side images, if both cases happen where a user removes a document sheet and where any factor in interrupting an operation of reading back sides arises.

According to the present exemplary embodiment, the information processing apparatus 200 connected to the image reading apparatus 100 has been described. However, there is no limitation of the configuration of an information processing apparatus in this embodiment. Alternatively, the CPU 105 in the image reading apparatus 100 may perform the same processes as the CPU 201 in the information processing apparatus 200 in this embodiment, thereby acting as an image processing apparatus in this embodiment. In this case, this image processing apparatus can also produce the same effect as the information processing apparatus 200.

The functions of this embodiment can be fulfilled by the following configuration. A program code for use in performing the process in this embodiment may be supplied to a system or an apparatus, and a computer (CPU or microprocessing unit (MPU)) in the system or the apparatus may execute the program code. The functions of this embodiment can thereby be fulfilled. It can be said that the program code that has been read from a storage medium fulfills the functions of this embodiment. It can also be said that the storage medium that stores the program code fulfills the functions of this embodiment.

The program code for use in performing the process in this embodiment may be executed by a single computer (CPU or MPU) or the cooperation of a plurality of computers. The program code may be executed by one or more computers, or hardware, such as a circuit, that fulfils the functions of the program code may be provided. A part of the program code may be implemented in hardware, and a remaining part thereof may be executed by one or more computers.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-220746, filed Oct. 29, 2014, which is hereby incorporated by reference herein in its entirety.

What is claimed is:

1. An image processing apparatus comprising:
a memory which stores a program; and
at least one processor,
wherein the at least one processor acquires
a plurality of first images and one or a plurality of second images, the plurality of first images being acquired through a first reading operation in which a reading apparatus sequentially reads front sides of a plurality of document sheets, the one or the plurality of second images being acquired through a second reading operation in which the reading apparatus reads back sides of one or more of the plurality of document sheets,
wherein the at least one processor determines a sequence of the plurality of first images and the one or the plurality of second images, such that, in a case where a second number of second images acquired by the acquiring is smaller than a first number of first images acquired by the acquiring, sequential numbers of a last page image among the plurality of first images and a last page image among the one or the plurality of second images are differently set depending on whether a factor in interrupting the second reading operation has arisen,
wherein a sequential number of the last page image among the plurality of first images, is set to a last sequential number in the sequence, in a case where the second number is smaller than the first number and the factor has not arisen, and
wherein a sequential number of the last page image among the one or the plurality of second images, is set to the last sequential number in the sequence, in a case where the second number is smaller than the first number and the factor has arisen.

2. The image processing apparatus according to claim 1, wherein the reading apparatus sequentially reads the front sides of the plurality of document sheets, and ejects the plurality of document sheets one by one to a document discharge unit of the reading apparatus such that the plurality of document sheets are stacked in the same sequence as before the front sides are read.

3. An image processing method comprising:
acquiring a plurality of first images and one or a plurality of second images, the plurality of first images being acquired through a first reading operation in which a reading apparatus sequentially reads front sides of a plurality of document sheets, the second images being acquired through a second reading operation in which the reading apparatus reads back sides of one or more of the plurality of document sheets; and
determining a sequence of the plurality of first images and the one or the plurality of second images, such that, in a case where the second number of second images acquired by the acquiring is smaller than the first number of first images acquired by the acquiring, sequential numbers of a last page image among the plurality of first images and a last page image among the one or the plurality of second images are differently set depending on whether an interrupting factor has arisen,
wherein a sequential number of the last page image among the plurality of first images, is set to a last sequential number in the sequence, in a case where the second number is smaller than the first number and the factor has not arisen, and
wherein a sequential number of the last page image among the one or the plurality of second images, is set to the last sequential number in the sequence, in a case where the second number is smaller than the first number and the factor has arisen.

4. The image processing method according to claim 3, wherein a sequence in which the plurality of document sheets are read in the second reading operation is the reverse of a sequence in which the plurality of document sheets are read in the first reading operation, and
when the plurality of second images are acquired, a sequence of the plurality of second images is determined to be the reverse of a sequence in which the plurality of document sheets are read in the second reading operation.

5. The image processing method according to claim 3, wherein the sequence is determined such that at least one of the plurality of second images is inserted between two images included in the plurality of first images.

6. The image processing method according to claim 3, wherein the sequence of the plurality of first images and the one or the plurality of second images is determined by sequentially determining a sequential number for each of the plurality of first images and the one or the plurality of second images.

7. The image processing method according to claim 3, wherein the sequence of the plurality of first images and the one or the plurality of second images is determined, regardless of the number of the one or the plurality of second images and according to a determining method depending on whether the interrupting factor has arisen.

8. The image processing method according to claim 3, further comprising performing a process based on the determined sequence on the plurality of first images and the one or the plurality of second images.

9. The image processing method according to claim 8, wherein in the performing, a display apparatus is caused to display the plurality of first images and the one or the plurality of second images such that the plurality of first images and the one or the plurality of second images are displayed in the determined sequence.

10. The image processing method according to claim 8, wherein in the performing, a print apparatus is caused to print the plurality of first images and the one or the plurality of second images such that the plurality of first images and the one or the plurality of second images are printed in the determined sequence.

11. The image processing method according to claim 8, wherein in the performing a file containing the plurality of first images and the one or the plurality of second images, is created based on the determined sequence.

12. The image processing method according to claim 8, further comprising adding a read image to the plurality of first images and the one or the plurality of second images, the read image being acquired by reading a document sheet with the reading apparatus, wherein in the performing, the process is performed on the plurality of first images, the one or the plurality of second images, and the added read image.

13. The image processing method according to claim 12, wherein the read image is added such that a sequential number of the read image in the sequence of the plurality of first images and the one or the plurality of second images which has been determined corresponds to a user's instruction.

14. The image processing method according to claim 3, wherein in the acquiring, an image read by the reading apparatus disposed externally and connected to an image processing apparatus executing the image processing method, is acquired.

15. The image processing method according to claim 14, further comprising receiving a status from the external reading apparatus, wherein in a case where a status related to the interrupting factor is received, the sequence corresponding to a case where the interrupting factor has arisen is determined.

16. The image processing method according to claim 3, wherein in the acquiring, an image read by the reading apparatus included in an image processing apparatus executing the image processing method, is acquired.

17. The image processing method according to claim 3, wherein the interrupting factor includes either a read error or a user's read cancellation.

18. The image processing method according to claim 3, wherein the reading apparatus sequentially reads the front sides of the plurality of document sheets, and ejects the plurality of document sheets one by one to a document discharge unit of the reading apparatus such that the plurality of document sheets are stacked in the same sequence as before the front sides are read.

19. A non-transitory storage medium that stores a program causing a computer to execute an image processing method, the method comprising:

acquiring a plurality of first images and one or a plurality of second images, the plurality of first images being acquired through a first reading operation in which a reading apparatus sequentially reads front sides of a plurality of document sheets, the second images being acquired through a second reading operation in which the reading apparatus reads back sides of one or more of the plurality of document sheets; and determining a sequence of the plurality of first images and the one or the plurality of second images, such that, in a case where the second number of second images acquired by the acquiring is smaller than the first number of first images acquired by the acquiring, sequential numbers of a last page image among the plurality of first images and a last page image among the one or the plurality of second images are differently set depending on whether an interrupting factor has arisen, wherein a sequential number of the last page image among the plurality of first images, is set to a last sequential number in the sequence, in a case where the second number is smaller than the first number and the factor has not arisen, and wherein a sequential number of the last page image among the one or the plurality of second images, is set to the last sequential number in the sequence, in a case where the second number is smaller than the first number and the factor has arisen.

* * * * *